United States Patent Office 3,283,582
Patented Nov. 8, 1966

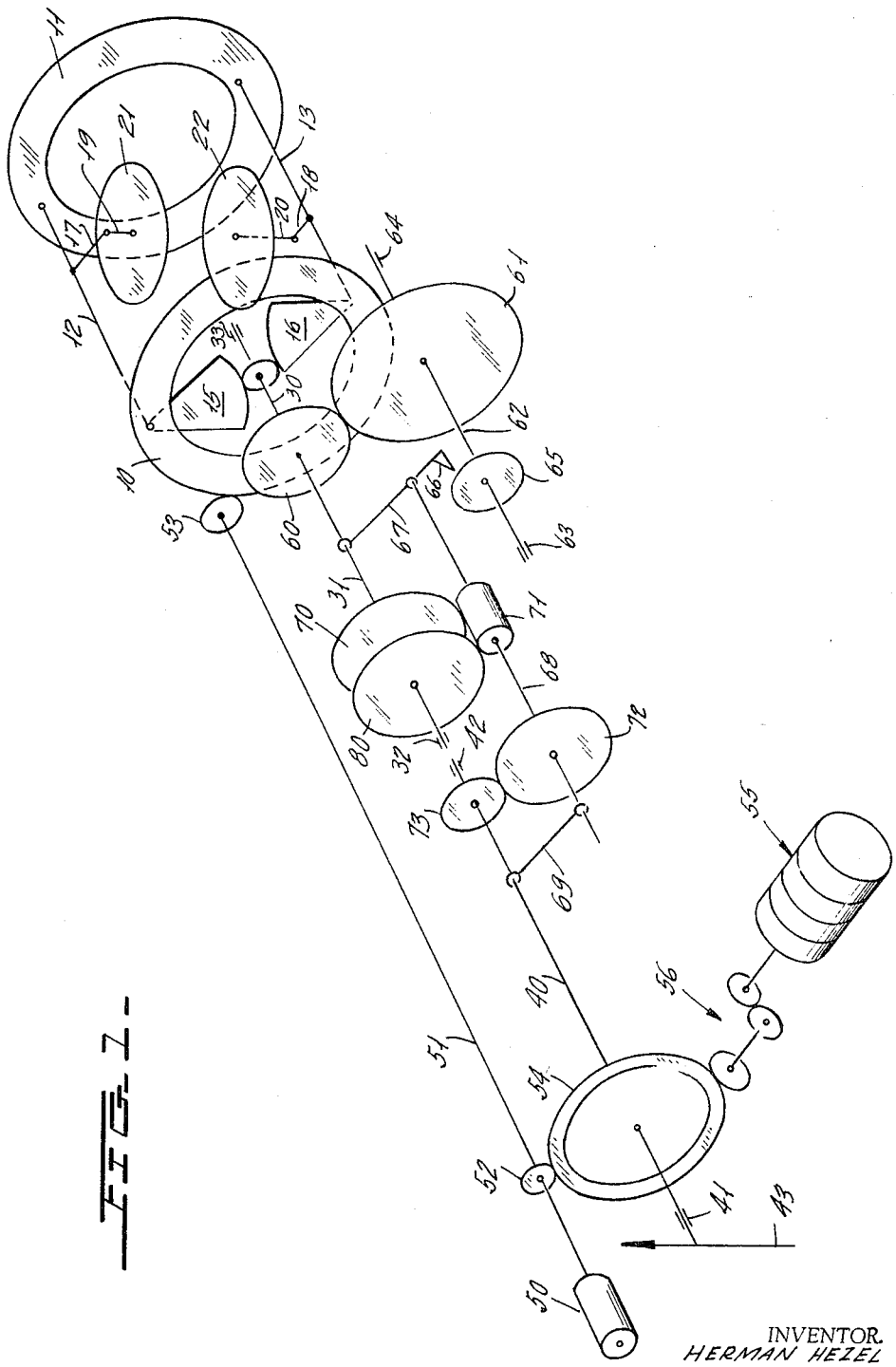

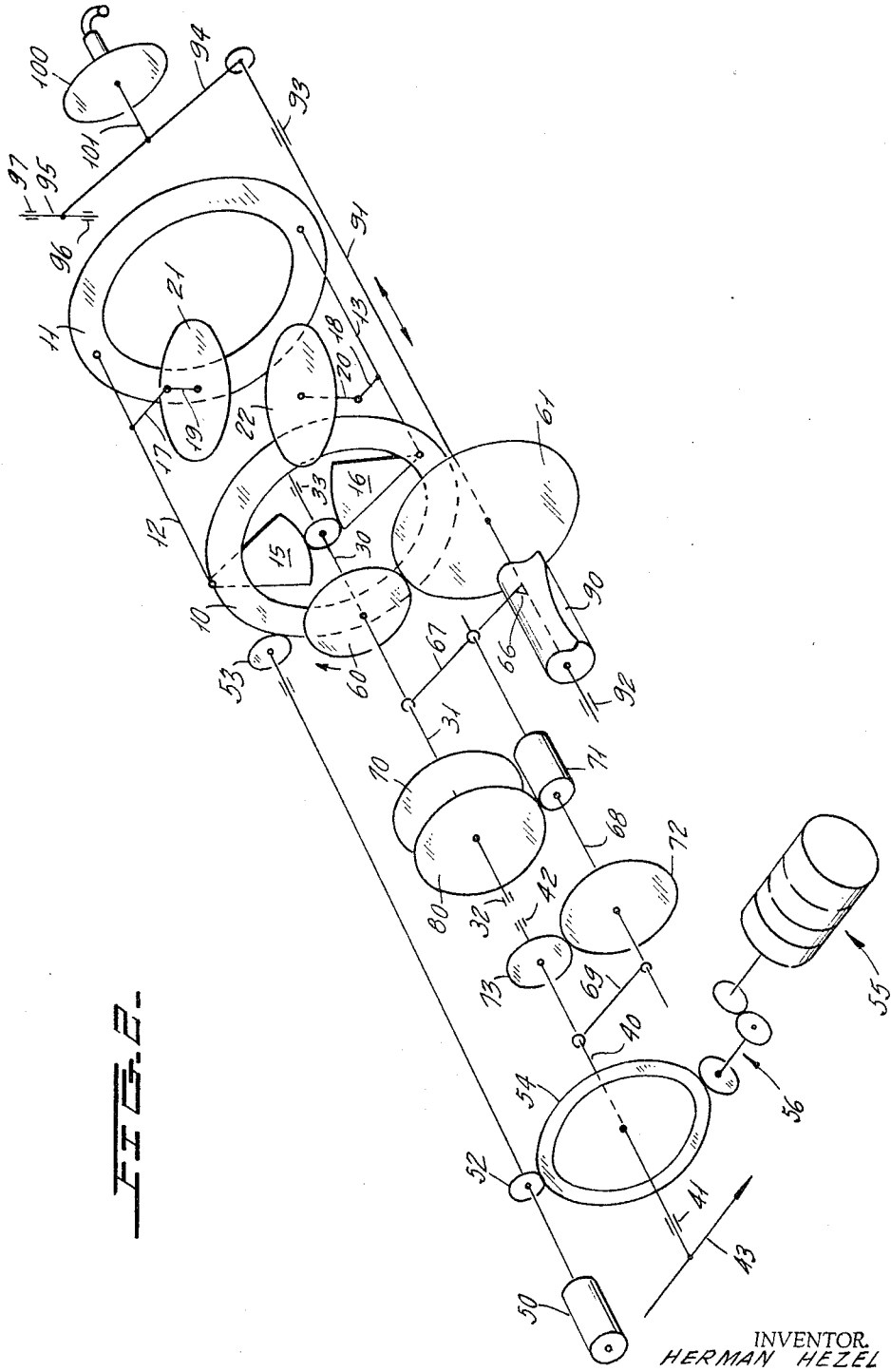

3,283,582
MECHANICALLY COMPENSATED ALTIMETER
Herman Hezel, Port Washington, N.Y., assignor to Kollsman Instrument Corporation, Elmhurst, N.Y., a corporation of New York
Filed Oct. 23, 1963, Ser. No. 318,239
4 Claims. (Cl. 73—384)

This invention relates to high accuracy pressure responsive instruments and more specifically relates to a novel altimeter type mechanism which has a cam type correction mechanism mechanically connected thereto for delivering a high precision indication.

High accuracy altimeters are commonly required to have an accuracy within one-half of one percent of the altitude reading. It is therefore necessary that the altimeter be suitably corrected for errors caused by a change in Mach number (static system errors) as well as correction of mechanical inaccuracies of the instrument itself. For example, the altitude indication of precision altimeters having a range of 80,000 feet will commonly show an oscillating pattern of increasing amplitude with altitude showing prominent antinodes at the 20,000, 40,000 and 80,000 foot levels. This undulating characteristic is the result of the interaction of diaphragm deflection, pressure-altitude relationship of the standard atmosphere, kinematic action of the mechanism which translates rectilinear motion into circular motion and the variation of the various spring characteristics of springs involved in the system.

In the past, corrections for these various inaccuracies have, for example, been computed by an electrically driven computer which is independent of the altimeter. Correction figures are then applied to the altimeter to cause a change in the mechanical altitude indication.

The principle of the present invention is to provide a novel mechanical linkage between the actuating diaphragms and the indicating pointer of the altimeter (or other equivalent pressure indicating device) wherein a mechanical correction system is interposed in this linkage. This mechanical correction system includes a novel planetary system for delivering angular position from the diaphragms to the pointer where the planetary system itself is rotated in accordance with a preprogrammed error correcting cam. Thus the indication such as a pointer is always at its corrected position independently of electrical auxiliary equipment which includes computers and the like.

The cam correcting device can be of various configurations and could, for example, be for a one dimensional type correction or alternatively, of the three dimensional type as will be descriped more fully hereinafter.

Accordingly, a primary object of this invention is to provide a novel high precision altimeter mechanism.

Another object of this invention is to provide a novel pressure operated mechanism wherein a correction factor is mechanically inserted into the mechanism of the device.

Still another object of this invention is to couple the indicating pointer of the pressure operated instrument to pressure diaphragms by means of a planetary gear system which can be corrected for instrument inaccuracies.

A still further object of this invention is to provide a high precision altimeter which is relatively inexpensive.

Another object of this invention is to provide a novel high precision altimeter system which is extremely reliable and does not rely on electrical power for high accuracy operation.

These and other objects of the invention will become apparent from the following description when taken in connection with the drawings in which:

FIGURE 1 shows a schematic perspective diagram of the novel instrument of the invention with an altitude correction cam drive arrangement.

FIGURE 2 is similar to FIGURE 1 and illustrates the manner in which a Mach number correction factor can be mechanically added to the system.

Referring first to FIGURE 1, I have schematically illustrated therein a basic altimeter mechanism which is of a type well known to the art with the exception of a novel planetary connection in the system. Thus, a pair of frame members 10 and 11 are carried within a suitable housing (not shown) and pivotally receive shafts 12 and 13 in suitable jeweled bearing arrangements. The left hand end of each of shafts 12 and 13 are then connected to sector gears 15 and 16 respectively in the well known manner while a point intermediate of shafts 12 and 13 is provided with crank arms 17 and 18 respectively. Each of crank arms 17 and 18 are then pivotally connected to output links 19 and 20 respectively of diaphragms 21 and 22 respectively. Diaphragms 21 and 22 are suitably mounted within the same housing as frames 10 and 11. Sector gears 15 and 16 then engage gear 30 which is secured to shaft 31 which is pivotally mounted in the bearings schematically illustrated as bearings 32 and 33 which are in a fixed position with respect to the main support housing.

To this point the mechanism described is of a standard and well known type. In the prior art the shaft 31 would be coextensive with the coaxial shaft 40 which is mounted in suitable bearings 41 and 42 and has the left hand end thereof connected to the instrument pointer 43. The pointer 43 will, of course, rotate with respect to a suitable calibrated dial face.

As pointed out above, had shaft 31 been directly connected to shaft 40, the instrument would be of the old well known type. Other prior art type equipment which is provided includes the barometric pressure control knob 50 which is directly connected to shaft 51 which is rotatably supported by suitable bearings (not shown) and which has gears 52 and 53 thereon. The gear 53 meshes with gear teeth on the exterior of frame member 10 which gear 52 meshes with a gear 54. The gear 54 is in turn connected to a barometric counter 55 through the gear train 56. Thus, in order to set the instrument to a particular reference pressure which could, for example, be the altitude of a landing field, the pressure at ground level is set on the barometric counter with the frame 10 (and frame 11 to which it is secured within the housing) rotating whereby the position of pointer 43 is rotated to its appropriate referenced level with respect to the dial face. Again, this type of barometric adjustment of the instrument is of the well known variety.

In accordance with the present invention, shaft 31 is connected to shaft 40 through a novel planetary system which permits the mechanical insertion of an error correcting cam. More specifically and in accordance with the invention, a gear 60 is directly secured to shaft 31 and drives a cooperating gear 61 which is mounted on auxiliary shaft 62 which is carried in a fixed position by the bearings schematically illustrated as bearings 63 and 64. A correction cam 65 which could, for example, be calibrated for altitude correction, is then secured to shaft 62 and positions the stylus 66 at the end of link 67 in accordance with the pre-cut configuration of cam 65 for that particular anguler orientation of shaft 31. The planetary system itself then includes the arm 67 which is rotatably mounted on shaft 31 as schematically illustrated, a shaft 68 and an arm 69 which is similarly rotatably mounted on the shaft 40 as schematically illustrated. The arms 67 and 69 then have suitable bearings for being rotatably mounted on the shafts 31 and 40 as schematically illustrated. The arms 67 and 69 then have suitable bearings for rotatably receiving shaft 68. A gear 70 is then directly secured to shaft 31 and meshes with gear 71 secured to shaft 68. A gear 72 which is also directly secured to shaft 68 then meshes with gear 73 which is directly secured to shaft 40 to complete the planetary drive system. Thus, as shaft 31 is rotated by sector gears 15 and 16, the gear 70 will be rotated to rotate gear 71 and shaft 68. This causes rotation of gear 72 and thus gear 73 so that by suitably arranging the diameters of the various gears of the planetary train, shaft 40 will rotate exactly along with shaft 31.

Since, however, the novel mechanism is of the planetary type, the angular position of the complete frame can be altered by the position of cam 65 which in turn is related to the mechanical indication of the altitude as measured in diaphragms 21 and 22. Thus the pre-cut cam 65 which will have undulations corresponding to the known altitude inaccuracies of the device will cause the rigid frame, including arms 67, 69 and shaft 68 to be raised and lowered, thereby causing an additional rotation of shaft 40 to correct the pointer position.

It will be noted that an additional gear 80 which is rotatable with respect to shaft 31 is also driven by gear 71. The gear 80 serves as an anti-back lash structure and is spring connected to gear 70 (not shown) so that gear 80 is biased to rotate in a direction opposite to gear 70.

While the embodiment of FIGURE 1 illustrates the invention with a single correction means, a novel cam arrangement is shown in FIGURE 2 for the case of a three dimensional cam 90 which incorporates a rotary motion as a direct function of altitude and longitudinal motion as a function of impact pressure $q_c$. Since Mach Number is a function of altitude and impact pressure $q_c$, the three-dimensional movement of cam 90 through stylus 66 becomes a true function of Mach Number. In all other respects, the altimeter of FIGURE 2 is identical to that of FIGURE 1 and like numerals identify identical components.

It wil be understood that rotation of cam 90 will cause the altitude correction in the manner of FIGURE 1. Cam 90, however, has axial length and the position thereof can be moved along the axis of its support shaft 91 which is carried in suitable bearings 92 and 93. Note that gear 61 may be suitably keyed to shaft 91 so that gear 61 rotates with shaft 91 but maintains a fixed axial position while cam 90 has both rotational and axial movement. The shaft 91 is then pivotally connected to a crank arm 94 which is secured to a vertical shaft 95 which is secured in fixed bearings 96 and 97. Thus, shaft 90 and crank arm 94 are in a plane which is perpendicular to shaft 95.

A differential diaphragm 100 which is exposed to a suitable impact pressure $q_c$, so that the diaghragm deflection is in accordance with $q_c$, is connected to arm 94 through output link 101. Accordingly, as impact pressure $q_c$ changes, arm 94 will be displaced and shaft 91 will be axially moved. This places stylus 66 on a different axial portion of cam 90, corresponding to the particular impact pressure $q_c$. The combined rotary and axial movements of cam 90 will impart a movement to stylus 66 which is a function of a particular Mach Number at a particular altitude, representing the required correction in altitude indication through the planetary system as previously described.

It is to be noted that the novel altimeter of the invention can provide extremely high precision readings and yet is of a simple construction and does not require that the needed correction first be computed in a separate computer system with the correction signal transmitted to the altimeter for correction thereof.

Conversely, in accordance with the invention, the correction is completely mechanical in nature and is provided in the instrument by a relatively minor change in a standard instrument construction.

Although our invention has been described with respect to its preferred embodiment, it should be understood that many variations and modifications will now be obvious to those skilled in the art, and we prefer, therefore, to be limited not by the specific disclosure herein but only by the appended claims.

I claim:

1. A pressure indicating mechanism including a presure transducer means, a mechanical linkage means and an indicating means; said mechanical linkage means being connected between said transducer means and said indicator means whereby said indicator means is moved to a position dependent upon the pressure applied to said transducer means; said mechanical linkage means including a first rotatable shaft connected to said pressure transducer means, a second rotatable shaft connected to said indicator means and a third rotatable shaft; third rotatable shaft having one end thereof pivotally connected to said first shaft and another end thereof pivotally connected to said second shaft; said first, second and third shafts having respective first, second and third gear means thereon; said first gear means engaging said second gear means; said second gear means engaging said third gear means; a correction cam means; said correction cam means being rotatably mounted with respect to said third shaft and bearing a cam surface operatively connected to said third shaft whereby rotation of said cam means rotates said third shaft with respect to said first and second shafts; and auxiliary mechanical means operatively connected between said pressure transducer means and said cam means for rotating said cam means to a position dependent upon the pressure applied to said transducer means.

2. The mechanism as set forth in claim 1 wherein said first and second shafts are coaxial and said third shaft is parallel to said first and second shafts.

3. The mechanism as set forth in claim 1 wherein said cam means is calibrated to correct the position of said indicator means according to a predetermined mechanical error in said indicating mechanism.

4. The device substantially as set forth in claim 1 which further includes impact pressure $q_c$ measuring transducer means; said cam means being axially movable with respect to said third shaft; and correcting means for connecting said cam means to said impact pressure $q_c$ measuring transducing means; said cam means being axially displaced according to the measured impact pressure $q_c$ whereby the position of said indicator is corrected for static pressure errors.

References Cited by the Examiner

UNITED STATES PATENTS

| 3,084,551 | 4/1963 | Westman | 73/410 |
| 3,154,944 | 11/1964 | Johanson | 73/182 |
| 3,160,006 | 12/1964 | Johanson | 73/182 |

LOUIS R. PRINCE, *Primary Examiner.*

D. O. WOODIEL, *Assistant Examiner.*